US006625867B2

(12) United States Patent
Jonker

(10) Patent No.: US 6,625,867 B2
(45) Date of Patent: Sep. 30, 2003

(54) IMPACT TOOL CARTRIDGE WITH SEPARATE CUTTING AND SEATING BLADES

(75) Inventor: Jeffrey P. Jonker, DeKalb, IL (US)

(73) Assignee: Ideal Industries, Inc., Sycamore, IL (US)

( * ) Notice: Subject to any disclaimer, the term of this patent is extended or adjusted under 35 U.S.C. 154(b) by 0 days.

(21) Appl. No.: 09/928,053

(22) Filed: Aug. 10, 2001

(65) Prior Publication Data

US 2003/0029022 A1 Feb. 13, 2003

Related U.S. Application Data

(60) Provisional application No. 60/224,914, filed on Aug. 11, 2000.

(51) Int. Cl.[7] ........................... B23P 23/00; B23P 19/00

(52) U.S. Cl. ....................... 29/566.4; 29/566.3; 29/750; 29/751; 29/758

(58) Field of Search ............................ 29/566.4, 566.3, 29/750, 758; 7/107

(56) References Cited

U.S. PATENT DOCUMENTS 3,708,852 A 1/1973 Mason
3,898,724 A * 8/1975 Conorich ................... 29/566.4
3,997,956 A * 12/1976 McKee ...................... 29/564.1
4,161,061 A 7/1979 Mason et al.
4,241,496 A 12/1980 Gregson
4,271,573 A * 6/1981 von Roesgen ............. 29/33 M
4,696,090 A 9/1987 Gregson et al.
4,703,543 A * 11/1987 Aceti et al. ................ 29/33 M
4,958,427 A 9/1990 Smith et al.
5,175,921 A 1/1993 Krietzman
5,195,230 A 3/1993 Krietzman
5,515,606 A * 5/1996 Albeck et al. ................ 29/850
5,604,948 A 2/1997 McMahon et al.
5,628,105 A 5/1997 Fallandy et al.
5,666,715 A * 9/1997 Zoiss et al. ................ 29/566.4
5,758,403 A * 6/1998 Fallandy ..................... 29/566.4
5,813,109 A * 9/1998 Ziegler et al. ............. 29/566.4
5,842,268 A * 12/1998 Arnfield .................... 29/566.4

* cited by examiner

*Primary Examiner*—A. L. Wellington
*Assistant Examiner*—Dana Ross
(74) *Attorney, Agent, or Firm*—Cook, Alex, McFarron, Manzo, Cummings & Mehler, Ltd.

(57) ABSTRACT

A tool cartridge for seating and cutting a communication wire in a terminal block. The cartridge includes a tool end and a base end. A wire seating blade and a wire cutting blade extend outwardly from the cartridge and are mounted for longitudinal movement relative to the cartridge and to each other. A spring bias detent assembly forces the wire seating and wire cutting blades into contact with each other for longitudinal movement together relative to the cartridge. A compression spring resists longitudinal movement of the wire seating and wire cutting blades in the direction of the base of the cartridge by seating pressure applied to the cartridge. A cam is positioned to release the detent assembly thereby disengaging the wire seating and wire cutting blades from movement together after a predetermined compression of the compression spring. The release of the blades from movement together permitting the compression spring to drive the cutting blade to its cutting position to cut the wire.

9 Claims, 5 Drawing Sheets

IMPACT TOOL CARTRIDGE WITH SEPARATE CUTTING AND SEATING BLADES

Applicant claims priority of U.S. application Ser. No. 60/224,914, filed Aug. 11, 2000.

BACKGROUND AND SUMMARY OF THE INVENTION

This invention is directed to an impact tool cartridge for use by telecommunication personnel for the insertion of conductor wires into terminal blocks. In particular, the invention is directed to a self-contained cartridge having seating and cutting blades which can be installed in a conventional or ergonomic tool handle. More particularly, the present invention is directed to a blade assembly having a seating blade and a cutting blade and to an impact tool cartridge which sequentially actuates the seating blade and then the cutting blade upon a continuous application of pressure to the impact tool by a user pushing it against a terminal block.

An object of this invention is an impact tool cartridge having a blade assembly which seats and terminates a wire in a single continuous application of force by the user against the wire and the terminal block.

Another object of this invention is a wire termination impact tool cartridge having a blade assembly in which the cutting blade is formed separately from the seating blade to allow all of the impact energy to be transmitted directly to the cutting blade of the blade assembly.

An additional object of this invention is a wire termination impact tool cartridge having a wire seating blade and a wire cutting blade which are spring biased into sliding engagement with each other in a direction longitudinal of the cartridge until the cutting blade is impelled in a wire cutting direction by the release of energy in a charged spring.

Yet another object of this invention is a wire termination impact tool cartridge in which the wire seating blade is retracted during the final application of force to the impact tool to allow the cutting blade to engage and cut the wire.

Still another object of this invention is a blade assembly of a seating blade and a cutting blade which are held in closely engaging contact during actuation of the cutting blade.

A further object of this invention is an impact tool cartridge adaptable to 66-type or 110-type blades.

BRIEF DESCRIPTION OF THE DRAWINGS

The invention is illustrated more or less diagrammatically in the following drawings wherein.

DESCRIPTION OF THE PREFERRED EMBODIMENTS

FIGS. 1 to 7 show a first embodiment of the invention which utilizes “66-type” and “110-type” blades for seating and connecting communications wire to a terminal block. Such blades are used in impact hand tools, many of which have somewhat rectangular transverse cross section handles or are ergonomically shaped in more recent tool handles. An advantage of this invention is that the blades can be installed in a cartridge which can be adapted to either type of tool handles with partitions formed in the handles of the tools to receive and support the cartridges. Usually the handles will be made in two longitudinal sections with the cartridge sandwiched between the sections.

Figure 6:
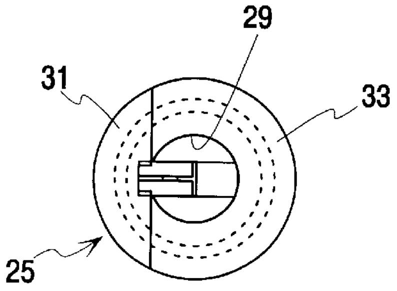
FIG. 6 is an end view taken along line 6—6 of FIG. 1.
Figure 7:
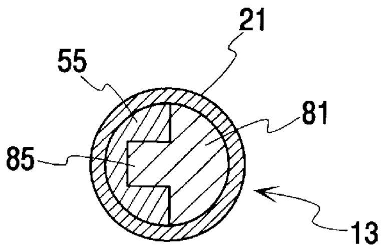
FIG. 7 is a cross sectional view taken along line 7—7 of FIG. 1.

The embodiment of FIGS. 1–7 of the drawings is somewhat prototypical in design but clearly depicts the structural and operational aspects of the invention and is intended to be used by itself or may be incorporated in a hand tool handle. This embodiment includes an elongated cylindrical cartridge 13 having a cap end 15 and a base end 17. A bore 19 extends from the cap end of the cartridge to the base end and the bore is enclosed by a thin tubular wall 21. An outwardly facing annular groove 23 is formed in the wall 21 adjacent the cap end 15. A cap 25, preferably formed of a suitable plastic or metal, is rotatably mounted on the cartridge by the means of an inwardly extending annular rib 27 which fits into the groove 23. An opening or passage 29 extends through the front wall of the cap as shown in FIG. 6. A protrusion 31 is located on the front end of the cap and a thinner annular end wall 33 extends around the remainder of the opening.

Figure 1:
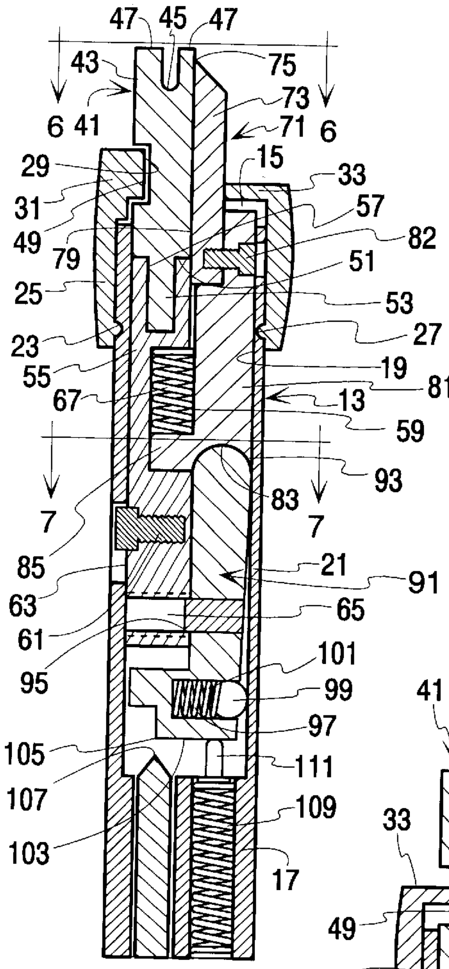
FIG. 1 is a longitudinally extending transverse cross sectional view taken through one embodiment of the impact tool cartridge of this invention and showing the tool in its locked position.
Figure 2:
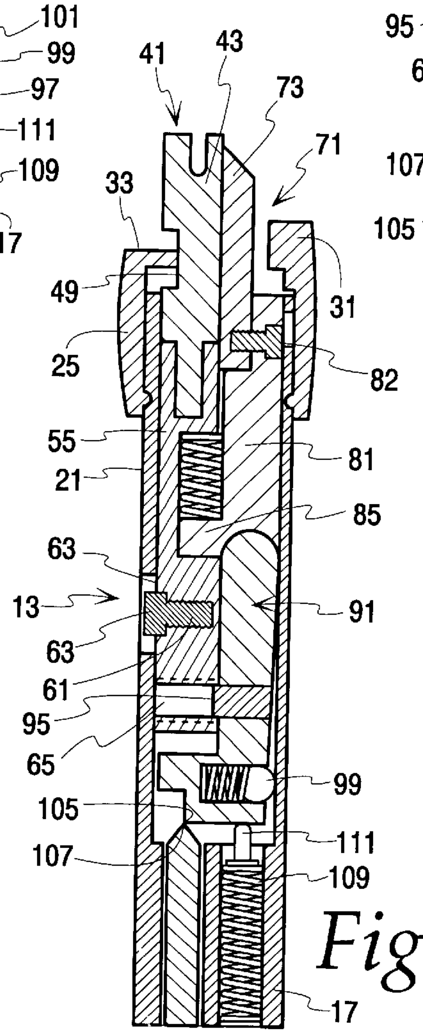
FIG. 2 is a view similar to the view of FIG. 1 but showing the tool cartridge cap in its unlocked actuating position with the wire seating and the wire cutting blades in longitudinally retracted positions as would occur when the seating tool is being forcibly engaged with a communication wire in a terminal block.
Figure 3:
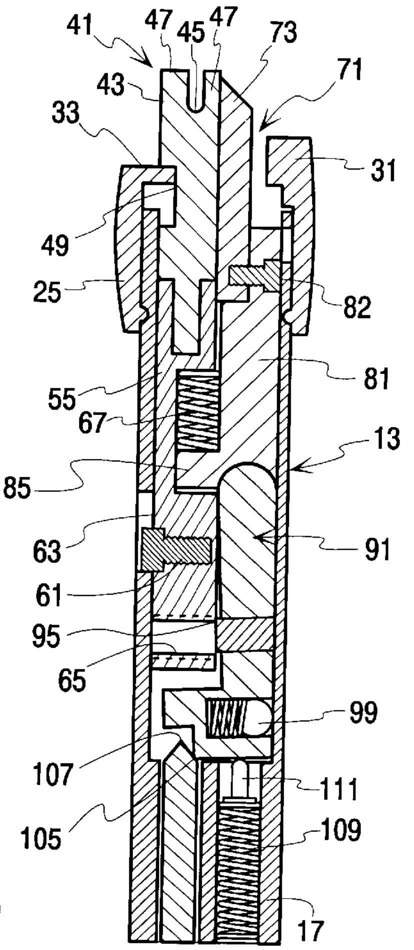
FIG. 3 is a view similar to the view of FIG. 2 but showing the wire seating and wire cutting blades in their fully retracted positions which occur simultaneously with the release of the seating and cutting blades for relative movement and before the forward cutting movement of the cutting blade.
Figure 4:
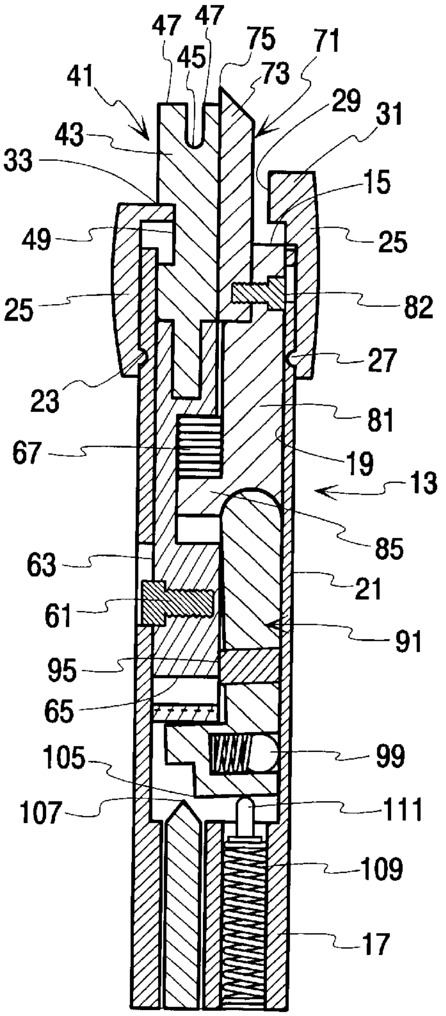
FIG. 4 is a view similar to the view of FIG. 3 but showing the cutting blade in its fully extended forward cutting position.
Figure 5:
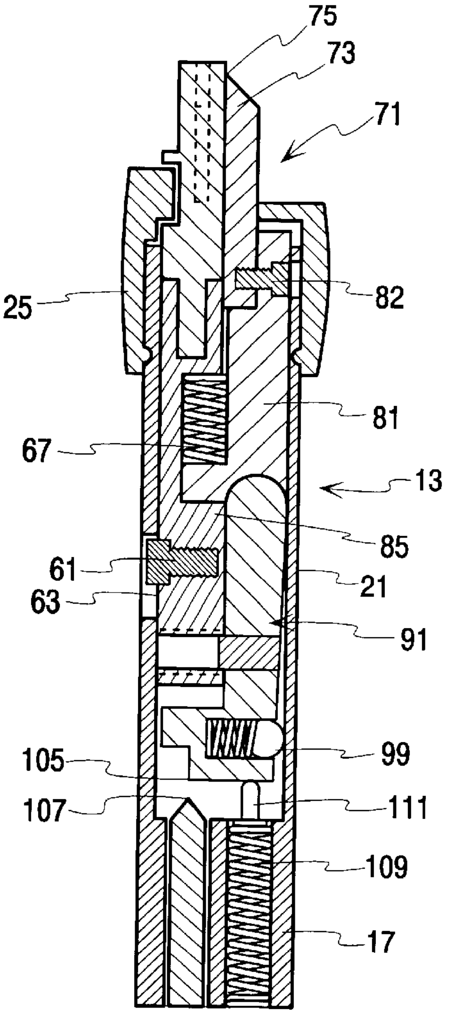
FIG. 5 is a view similar to the view of FIG. 1 but showing a 66-type blade assembly.

The conventional impact tool utilizes either a 66 type or 110 type blade that has both seating and cutting functions at one end and only seating functions at the opposite end. In contrast, this invention provides independent seating and cutting blades at one end of the tool. A seating blade assembly 41 includes a seating blade 43. A seating notch 45 is provided at the tip of the blade separating wire contacting surfaces 47. A notch 49 is formed in the side of the seating blade which notch receives the protrusion 31 on the cap 25 in the manner shown in FIG. 1 of the drawings and also receives the thinner annular wall 33 of the cap as shown in FIGS. 2 and 3 of the drawings. A generally rectangular base 51 is formed as part of the blade and a seating pin 53 extends from the base in the direction of the cartridge base 17. A seating blade holder 55 includes a socket 57 for receiving the blade seating pin 53. A spring and shoe pocket 59 is formed in one side of the seating blade holder. On the opposite side, a headed limit pin 61 fits into a threaded passage in the holder 55 with the head of the pin riding in an elongated slot 63 formed in the thin tubular wall 21 of the cartridge 13. A sear pin socket 65 opens through one side of the seating blade holder. A seating blade return spring 67 fits into the spring pocket 59.

The cutting blade assembly 71 includes a cutting blade 73 having a sloped surface ending in a cutting tip 75. The blade is received in a notch 79 of a cutting blade holder 81. A screw 82 extends through an opening in the wall 21 of the cartridge 13, is fastened to the cutting blade holder 81 and extends into the cutting blade 73 to secure the blade 73 to the holder 81. An arcuate base 83 is formed on the end of the cutting blade holder opposite to the cutting tip 75. A shoe 85 extends laterally from the base of the cutting blade holder and engages the seating blade return spring 67 in the pocket 59 of the seating blade holder.

A sear pin holder 91 has an arcuate surface 93 at its end adjacent the cutting blade holder. This arcuate surface seats in the arcuate base 83 of the cutting blade holder. The sear pin holder includes a sear pin 95 projecting from a side and fitting into the sear pin socket 65 of the seating blade holder 55. The sear pin is formed as a separate piece extending from a hole in a side of the sear pin holder. On the opposite side of the sear pin holder an outwardly opening socket 97 receives a ball 99 biased outwardly by a spring 101. A base 103 is formed at the end of the sear pin holder distal from the cutting blade holder and includes a cam follower edge 105. A cam 107 mounted in the base 17 of the cartridge 13 engages the cam follower edge 105. A drive spring 109 also mounted in the base 17 of the cartridge 13 adjacent the cam 107 has a drive spring plunger 111 which engages the base 103 of the sear pin holder 91.

A second embodiment of this invention is shown in FIGS. 8–15 of the drawings. This embodiment is intended for use by itself or may be incorporated in a hand tool handle. It includes an elongated cylindrical cartridge tool 203 having an enlarged cylindrical base 205, a cap end 207 and a base end 209. A bore 211 extends from the cap end to the base end of the cartridge and the bore is enclosed by a thin tubular wall 213. An outwardly facing annular groove 215 is formed in the wall 213 adjacent the cap end 207. A cap 217, preferably formed of a suitable plastic or metal, is rotatably mounted on the cartridge by means of a thin, monofilament thread or spring 219 which fits into the groove 215. An annular opening or passage 221 extends through the front end of the cap. A protrusion 223 is formed on the front end of the cap and a thinner annular web 225 extends around the remainder of the opening 221. Four longitudinally extending notches 227 are formed in the bottom wall of the cap and are located 90° apart around the periphery thereof. A ball detent 229 extends from a collar 235 mounted on the cartridge near the cap end 207 of the cartridge. The ball detent 229 seats into a selected one of the notches 227 to lock the cap in one of four positions. These positions include locked and unlocked positions for movement of the blades to be described as welt as positions in which the seating and cutting blade assemblies are either removable or not removable through the opening 221 of the cap. A tangential opening 231 extends through the cap to align with the annular groove 215 in the cylindrical wall. This tangential opening receives the monofilament thread or spring 219. A collar 235 is mounted over the cartridge near the cap end 207 thereof to engage the cap 217. The collar 235 may be grasped by a user to lift and rotate the cartridge relative to a tool handle having posts (not shown) which fit in one of four locking slots 237 formed 90° apart in the base 209. The collar is lifted against a spring mechanism in a tool handle to permit a ratcheting rotation of the cartridge.

Figure 8:
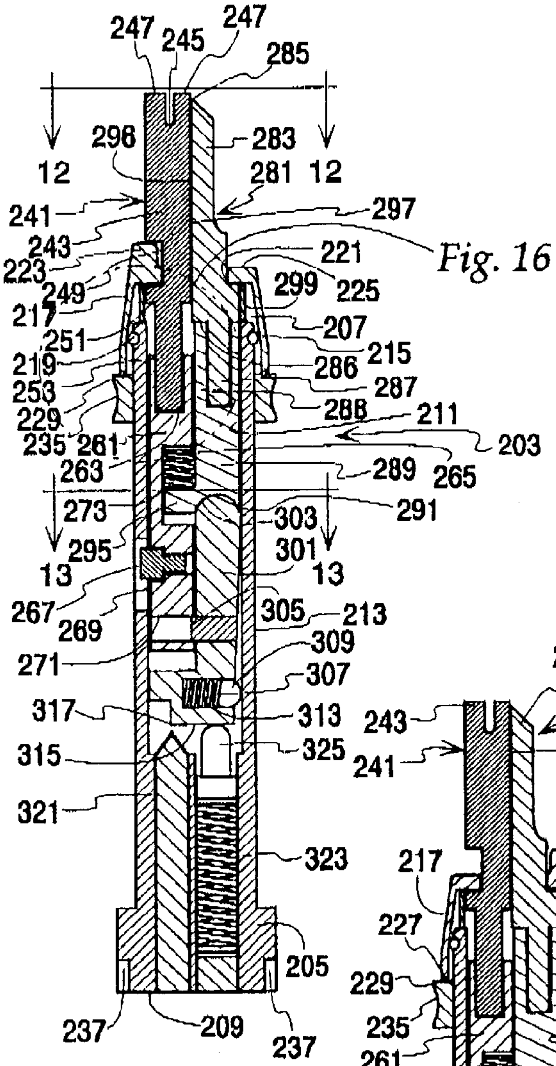
FIG. 8 is a longitudinally extending transverse cross sectional view taken through another embodiment of the impact tool cartridge of the invention and showing the tool in its locked position.
Figure 9:
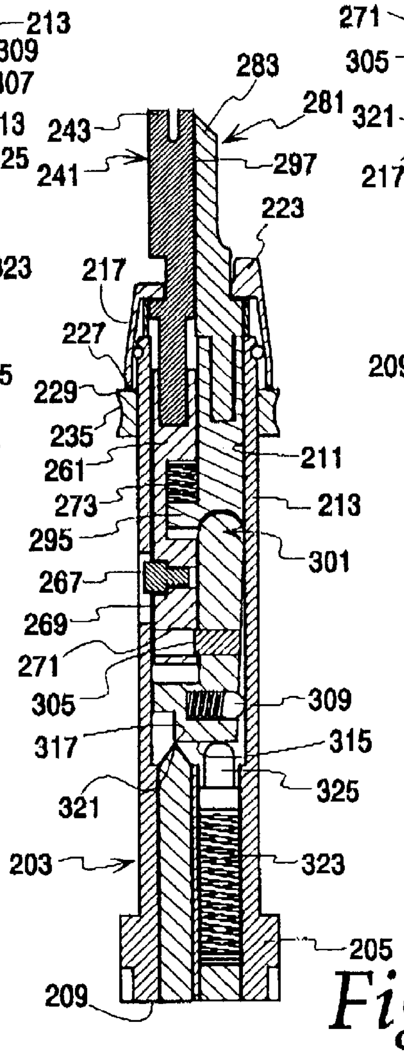
FIG. 9 is a view similar to the view of FIG. 1 but showing the tool cartridge cap in its unlocked actuating position with wire seating and wire cutting blades in longitudinally retracted positions as would occur when the seating tool is being forcibly engaged with a communication wire in a terminal block.
Figure 10:
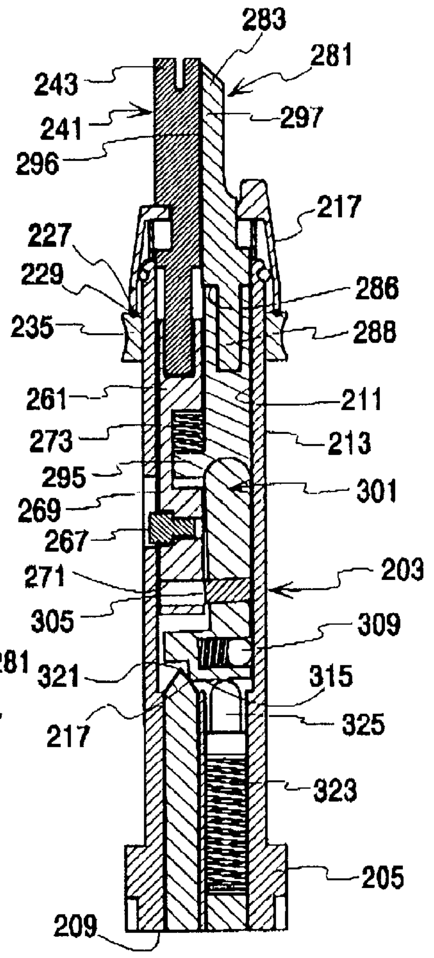
FIG. 10 is a view similar to the view of FIG. 9 but showing the wire seating and wire cutting blades in their fully retracted positions which occur simultaneously with the release of the seating and cutting blades for relative movement and before the forward cutting movement of the cutting blade.
Figure 11:
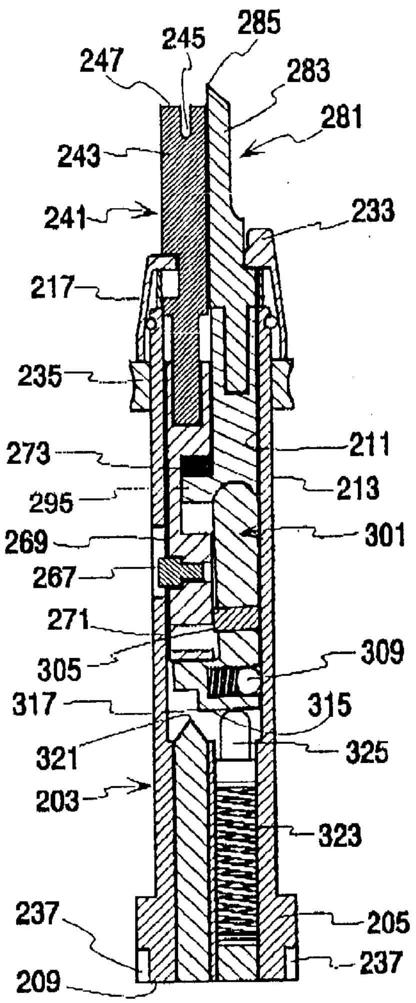
FIG. 11 is a view similar to the view of FIG. 10 but showing the cutting blade in its fully extended forward cutting position.
Figure 15:
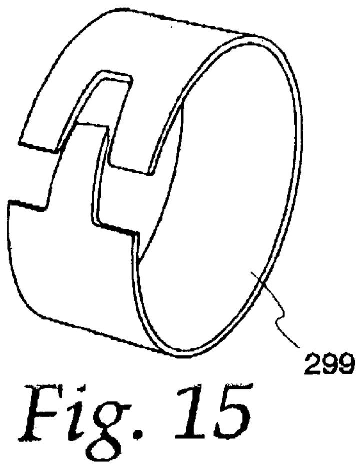
FIG. 15 is an orthogonal view of a compressional ring.

A seating blade assembly 241 includes a seating blade 243. A seating notch 245 is provided at the tip of the blade separating wire contacting surfaces 247. A notch 249 is formed in the side of the seating blade which notch receives the protrusion 223 on the cap in the manner shown in FIG. 8 of the drawings and also receives the thinner annular web 225 of the cap as shown in FIGS. 9 and 10 of the drawings. A generally rectangular base 251 is formed as part of the blade and a seating pin 253 extends from the base in the direction of the cartridge base 205. A seating blade holder 261 includes a socket 263 for receiving the base seating pin 253. A spring and shoe pocket 265 is formed in one side of the seating blade holder. On the opposite side, a headed limit pin 267 fits into a threaded passage in the seating blade holder 261 with the head of the pin riding in an elongated slot 269 formed in the thin tubular wall 213 of the cartridge 203. A sear pin socket 271 opens through one side of the seating blade holder. A seating blade return spring 273 fits into the spring and shoe pocket 265.

Figure 14:
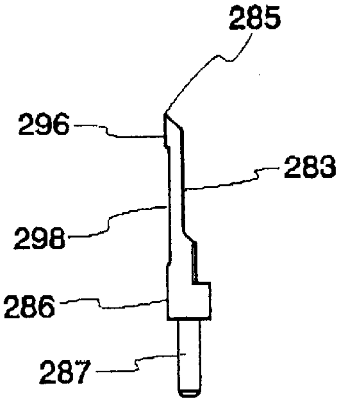
FIG. 14 is a side elevational view of a wire cutting blade.
Figure 12:
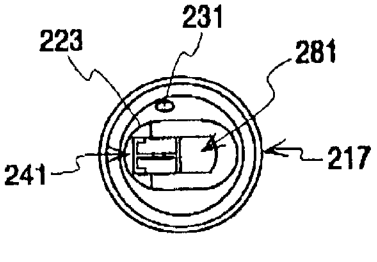
FIG. 12 is an end view taken along line 12—12 of FIG. 8.
Figure 13:
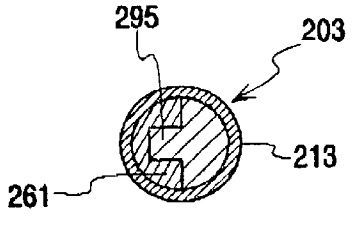
FIG. 13 is a cross sectional view taken along line 13—13 of FIG. 8.
Figure 16:
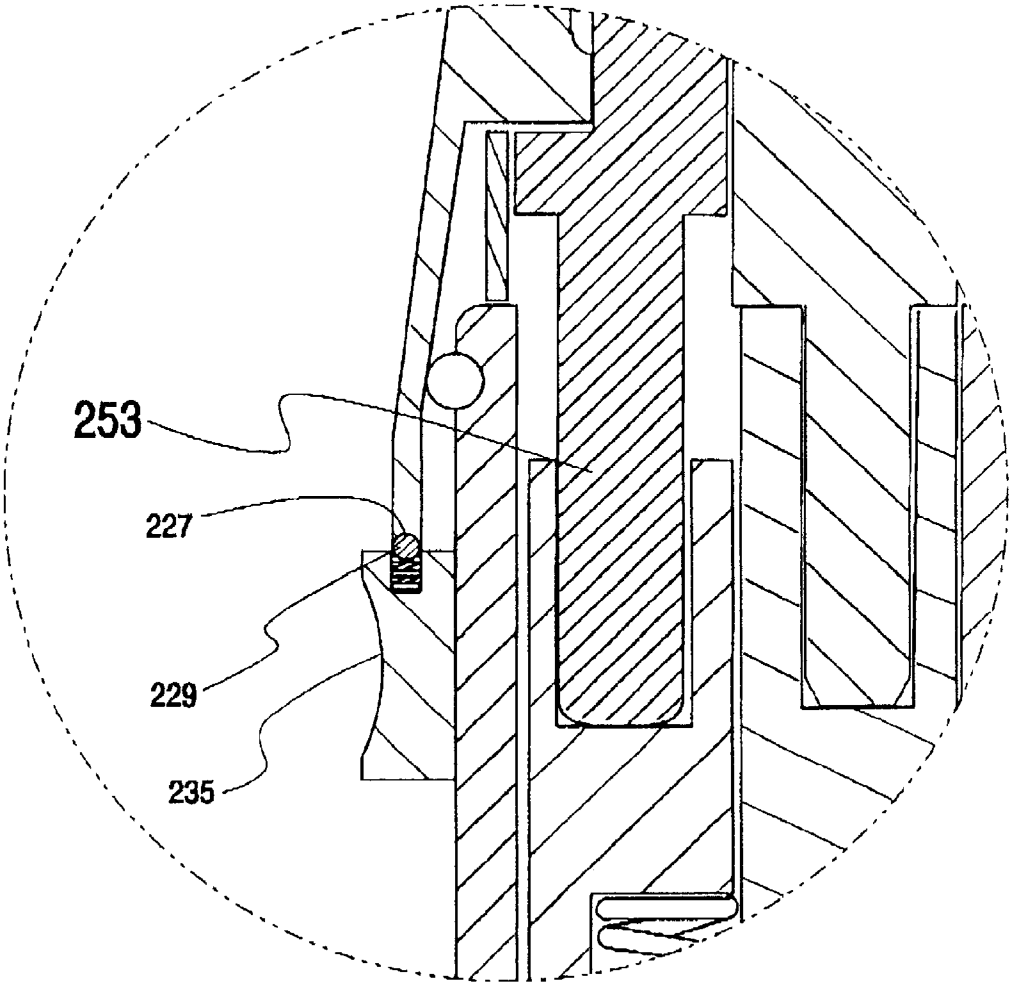
FIG. 16 is an enlarged, partial view of the cap indexing mechanism of FIG. 8.

The cutting blade assembly 281 includes a cutting blade 283 having a sloped surface ending in a cutting tip 285 and a base 286. A seating pin 287 of the blade is seated in a socket 288 of a cutting blade holder 289. An arcuate base 291 is formed on the end of the cutting blade holder opposite to the cutting tip 285. A shoe 295 extends laterally from the base of the cutting blade holder and engages the seating blade return spring 273 in the pocket 265 of the seating blade holder. As shown in FIG. 14 of the drawings, the cutting blade 283 has a side 296 which is positioned contiguous to an adjacent side 297 of seating blade as shown in FIG. 8. The side 296 is undercut by a groove 298 approximately 0.010" deep extending a portion of the distance between the cutting tip 285 and the base 286 of the blade. The compression ring 299 shown in detail in FIG. 15 engages the seating blade 243 and the cutting blade 283 near their respective bases to securely hold the remaining portion of the wall side 296 adjacent the cutting tip 285 against the side 297 of the seating blade without the need to form said blades to close tolerances.

A sear pin holder 301 has an arcuate surface 303 at its end adjacent the cutting blade holder. This arcuate surface seats in the arcuate base 291 of the cutting blade holder. The sear pin holder includes a sear pin 305 projecting from a side and fitting into the sear pin socket 271 of the seat blade holder 261. On the opposite side of the sear pin holder, an outwardly facing opening socket 307 receives a ball 309 biased outwardly by a spring 313. A base 315 is formed at the end of the sear pin holder distal from the cutting blade holder and includes a cam follower edge 317. A cam 321 mounted in the base 209 of the cartridge 203 engages the cam follower edge 317. A drive spring 323 also mounted in the base in 209 of the cartridge adjacent the cam 321 has a drive spring plunger 325 which engages the base 315 of the sear pin holder 301.

Use, Operation and Function of This Invention

The operation of the cylindrical cartridges 13 and 203 are essentially the same and will be described simultaneously. Any difference in operation due to their slightly different construction will be noted. FIGS. 1 and 8 of the drawings show the cartridges 13, 203 in positions in which their seating blade assemblies, 41, 241 and cutting blade assemblies 71, 281 are in locked positions in which neither the seating blades nor the cutting blades can be moved longitudinally relative to their respective cartridges. These locked positions are appropriate when the cartridges are carried by a worker or when the cartridges are intended to be used to only seat and not cut wires in a terminal block. As shown in FIGS. 1 and 8, the seating blades 43, 243 are locked against longitudinal movement relative to the cartridges 13, 203 by a protrusion 31, 223 on the rotatably mounted cap 25, 217 which protrusion seats in a notch 49, 249 in the seating blade 43, 243.

To change the cartridge 13, 203 to a cutting mode, the rotatably mounted cap 25, 217 is rotated from its position shown in FIGS. 1 and 8 to the position shown in FIGS. 2 and 9. In this position of rotation of the cap, the thinner annular end wall 33, 225 of the cap is now positioned in the notch 49, 249 in the side of the seating blade 43, 243 thus allowing longitudinal movement of the seating blade relative to the cartridge. With the seating blade 43, 243 in a position in which it can move longitudinally relative to the cartridge 13, 203, the seating blade 43, 243 is placed against a terminal board and wires and a seating force is applied against the base end 17, 209 of the cartridge 13, 203. The seating blade 43, 243 moves longitudinally towards the base end 17, 209 of the cartridge 13, 203 carrying with it the seating blade holder 55, 261, the cutting blade assembly 71, 281 and the sear pin holder 91, 301 which are moved until the cam follower edge 105, 317 engages the cam 107, 321 as shown in FIGS. 2 and 9 of the drawings. During this movement of the seating blade 43, 243 towards the base end 17, 209 of the cartridge 13, 203, the base 103, 315 of the sear pin holder 91, 301 has been engaging the plunger 111, 325 of the drive spring 109, 323 compressing it against the base end 17, 209 of the cartridge.

Continued movement of the seating blade 43, 243 in the direction of the base end 17, 209 of the cartridge 13, 203 causes the cam 107, 321 to tilt the sear pin holder 91, 301 to the right as viewed in FIGS. 3 and 10 of the drawings against the biasing pressure of its bias member 97, 307 to release the sear pin 95, 305 from the sear pin socket 65, 271 in the seating blade holder 55, 261. This action releases the cutting blade assembly 71, 281 from longitudinal movement with the seating blade assembly 41, 241 thereby allowing the drive spring 109, 323 through its drive plunger 111, 325 to move the sear pin holder 91, 301 in a longitudinal direction towards the cap end 15, 207 of the cylindrical housing 13, 203. This movement of the sear pin holder 91, 301 also moves the cutting blade holder 81, 289 and the cutting blade 73, 283 longitudinally relative to the cartridge 13, 203 in the direction of the cap end 15, 207 of the cartridge to move the cutting blade 73, 283 and its cutting tip 75, 285 relative to the seating blade assembly 41, 241 to the position shown in FIGS. 4 and 11 of the drawings in which the cutting tip 75, 285 will cut the wire seated against the terminal block. The movement of the cutting blade holder 81, 289 to the position shown in FIGS. 4 and 11 of the drawings compresses the seat blade return spring 67, 273 due to engagement of the shoe 85, 295 of the cutting blade holder 81, 289 with the spring. Upon withdrawal of the cartridge 13, 203 from engagement with the terminal board, the seat blade return spring 67, 273 will return the seating blade assembly 41, 241 and cutting blade assemblies 71 and 281 to the position shown in FIG. 1 of the drawings.

What is claimed is:

1. A tool cartridge for seating and cutting a communication wire in a terminal block, said tool cartridge including:

an elongated cartridge having a tool end and a base end, a wire seating blade and a wire cutting blade located in said cartridge and extending outwardly thereof, said wire seating and said wire cutting blades mounted in said cartridge for longitudinal movement relative to said cartridge and to each other, a spring bias detent assembly forcing said wire seating and said wire cutting blades into engagement with each other for longitudinal movement together relative to said cartridge, a compression spring resisting longitudinal movement of said wire seating and said wire cutting blades in a direction toward said base end of said cartridge by seating pressure applied to said cartridge, a cam positioned to release said detent assembly thereby disengaging said wire seating and wire cutting blades from movement together after a predetermined amount of compression of said compression spring, and said compression spring being released upon release of said detent assembly driving said wire cutting blade relative to said wire seating blade towards said tool end of said cartridge to cut said wire.

2. The tool cartridge of claim 1 in which said spring bias detent assembly includes a projection which seats in a recess to hold said wire seating and said wire cutting blades together for longitudinal movement relative to said cartridge with said projection formed on one of said wire seating and wire cutting blades and said recess formed on the other of said wire seating and said wire cutting blades.

3. The tool cartridge of claim 1 including a cap rotatably mounted on said tool end of said cartridge for rotation between a first position in which said cap engages and prevents longitudinal movement of said wire seating blade relative to said cartridge and a second position in which said cap permits longitudinal movement of said seating blade relative to said cartridge.

4. The tool cartridge of claim 1 including a return spring energized by cutting movement of said cutting blade and which is positioned to return said cutting blade to engagement with said seating blade upon deenergization of said return spring.

5. The tool cartridge of claim 1 in which each of said seating and cutting blades has a longitudinal side contiguous to a longitudinal side of said other blade, each of said blades has a tip and a base, an undercut is formed in one of said contiguous longitudinal sides of one of said blades between said tip and said base and a compression collar biases said blades into contact with each other.

6. The tool cartridge of claim 3 in which said cap is removably fastened to said cartridge.

7. The tool cartridge of claim 6 in which said cap is fastened to said cartridge by a monofilament.

8. The tool cartridge of claim 1 in which a collar is secured to said cartridge at said tool end and a shoulder is formed in said base end for seating said tool in a handle and grooves for locking against rotational movement of said cartridge with respect to the holder.

9. The tool cartridge of claim 3 in which said cap has an opening for passage of said wire seating blade and said wire cutting blade, said opening is oval in cross section to engage said blades to prevent removal in one position of rotation and to allow removal in another.

* * * * *